(12) United States Patent
Chan et al.

(10) Patent No.: US 10,270,742 B2
(45) Date of Patent: Apr. 23, 2019

(54) CRYPTOGRAPHIC SERVICE WITH OUTPUT REDIRECTION

(71) Applicant: ARRIS Enterprises LLC, Suwanee, GA (US)

(72) Inventors: Tat Keung Chan, San Diego, CA (US); Alexander Medvinsky, San Diego, CA (US); Ali Negahdar, Duluth, GA (US)

(73) Assignee: ARRIS Enterprises LLC, Suwanee, GA (US)

(*) Notice: Subject to any disclaimer, the term of this patent is extended or adjusted under 35 U.S.C. 154(b) by 93 days.

(21) Appl. No.: 15/083,242

(22) Filed: Mar. 28, 2016

(65) Prior Publication Data

US 2017/0085532 A1    Mar. 23, 2017

Related U.S. Application Data

(60) Provisional application No. 62/139,049, filed on Mar. 27, 2015.

(51) Int. Cl.
```
G06F 21/57      (2013.01)
G06F 21/64      (2013.01)
H04L 29/06      (2006.01)
H04L 9/32       (2006.01)
G06F 21/60      (2013.01)
```

(52) U.S. Cl.
CPC ........ *H04L 63/0281* (2013.01); *G06F 21/602* (2013.01); *G06F 21/64* (2013.01); *H04L 9/3247* (2013.01); *H04L 63/0428* (2013.01); *H04L 63/126* (2013.01); *H04L 63/145* (2013.01); *H04L 63/10* (2013.01); *H04L 2209/76* (2013.01)

(58) Field of Classification Search
None
See application file for complete search history.

(56) References Cited

U.S. PATENT DOCUMENTS 9,130,917 B2 * 9/2015 Smith ................. H04L 61/1511
2012/0030471 A1 * 2/2012 Li .......................... H04L 9/321
                                                            713/176

OTHER PUBLICATIONS

Network-based Root of trust for Installation. Schiffman et al. IEEE(2011).*
CN 103685278. English Translation. Dec. 17, 2013.*
Strategies for managed Software Integrity Protection. Schafer et al. IEEE(2010).*
JP2004227191. Englsih Translation. Aug. 8, 2004.*

* cited by examiner

*Primary Examiner* — Venkat Perungavoor
(74) *Attorney, Agent, or Firm* — Thomas A. Ward

(57) ABSTRACT

A method is provided for redirecting signed code images. The method includes the steps of receiving a code image from an origin device at a proxy machine, invoking a code signing client at the proxy machine, receiving signing request information indicating a requested cryptographic operation, sending a code signing request to a code signing server, receiving a signed code image at the code signing client from the code signing server, storing the signed code image in a restricted memory, invoking a software repository client at the proxy machine, and sending the signed code image from the restricted memory location to a software repository.

14 Claims, 2 Drawing Sheets

CRYPTOGRAPHIC SERVICE WITH OUTPUT REDIRECTION

CLAIM OF PRIORITY

This Application claims priority under 35 U.S.C. § 119(e) from earlier filed United States Provisional Application Ser. No. 62/139,049, filed Mar. 27, 2015, which is hereby incorporated by reference.

TECHNICAL FIELD

The present disclosure relates to the field of code signing, particularly a system and method for requesting that code images be digital signed and/or encrypted, and storing resulting signed code images at a remote software repository.

BACKGROUND

Many modern electronic devices, such as mobile phones, cable boxes and other set-top boxes, cable modems, and other devices, are computing devices that perform operations based on software and/or firmware loaded on the device. To prevent malicious code from being run on such devices, authorized code is often digitally signed and/or encrypted before it is loaded onto devices. The devices can be configured to reject code that is not properly signed and/or encrypted, with the goal that only legitimate and authorized code can be loaded and run on the devices.

Code that has been developed and is intended to be loaded onto a device can initially be unsigned and unencrypted. To sign and/or encrypt the code such that it can be loaded onto the device, the code can be submitted to a separate security component, such as a component comprising a Hardware Security Module (HSM). The security component can then perform cryptographic operations, such as code signing and encryption, using digital signatures and/or keys stored at the security component. For example, a software developer who has written code for a device can submit the initially unsigned code to a dedicated code signing server that is configured to sign and/or encrypt the code using digital signatures and/or encryption keys stored at the server. The signed code can then be incorporated into the device.

In some situations it can be desirable to store final signed code images at a software repository instead of directly returning them to developers or other users who initially requested the code signing. For example, some product manufacturers or developers can attempt to comply with export control regulations such as the United States Export Administration Regulations ("EAR"), by storing final signed code images at a software repository where they can be managed and controlled. By doing so, the signed code images can be centrally managed and access to them can be restricted. For example, developers can be restricted from accessing final signed code images and loading them into products that will cross national boundaries until proper export licenses have been obtained.

Some entities have attempted to have signed code images automatically submitted to a designated software repository by changing the code signing server's configuration such that signed code images produced by the code signing server are sent to the software repository instead of returning them to the devices that actually requested code signing. However, this solution requires changes to the code signing server itself, which may affect proper operations in alternate situations where it is permissible for signed code to be returned directly to the device that requested it. Moreover, in some situations a user that requested code signing may not be notified when the code signing is complete if the code signing server is configured to send the signed code it produces to a different location instead of back to the original requesting user.

What is needed is a system and method for submitting code images to be signed, such that resulting signed code images are stored at a software repository before being accessible by authorized users.

SUMMARY

In one embodiment, the present disclosure provides a method of redirecting signed code images, the method comprising receiving a code image from an origin device at a proxy machine, invoking a code signing client at the proxy machine in response to instructions received from the origin device, receiving signing request information at the code signing client from the origin device, the signing request information indicating a requested cryptographic operation, sending a code signing request from the code signing client to a code signing server, wherein the code signing request comprises the code image and the requested cryptographic operation, receiving a signed code image at the code signing client from the code signing server in response to the code signing request, storing the signed code image in a restricted memory location at the proxy machine, invoking a software repository client at the proxy machine with the code signing client, and sending the signed code image from the restricted memory location to a software repository with the software repository client.

In another embodiment, the present disclosure provides a method of redirecting signed code images, the method comprising receiving a code image from an origin device at a proxy machine, invoking a code signing client at the proxy machine in response to instructions received from the origin device, receiving signing request information at the code signing client from the origin device, the signing request information indicating that digital signing of the code image has been requested by the origin device, sending a code signing request from the code signing client to a code signing server, receiving a digital signature at the code signing client from the code signing server in response to the code signing request, combining the code image at the code signing client with the digital signature to generate a signed code image, storing the signed code image in a restricted memory location at the proxy machine, invoking a software repository client at the proxy machine with the code signing client, and sending the signed code image from the restricted memory location to a software repository with the software repository client.

In another embodiment, the present disclosure provides a code signing system, the system comprising a code signing client operable on a proxy machine in selective data communication with an origin device, a code signing server, and a software repository, wherein the code signing client is configured to receive an unsigned code image from the origin device, submit the unsigned code image to the code signing server with a code signing request, receive a signed code image from the code signing server in response to the code signing request, and store the signed code image at a restricted memory location at the proxy machine, and a software repository client operable on the proxy machine, wherein the code signing client is configured to access the signed code image at the restricted memory location, transmit the signed code image to the software repository, receive a status message from the software repository confirming that the signed code image has been stored at the software repository, and send an access notification to one or more users when the status message is received.

BRIEF DESCRIPTION OF THE DRAWINGS

Further details of the present invention are explained with the help of the attached drawings in which.

DETAILED DESCRIPTION

Figure 1:
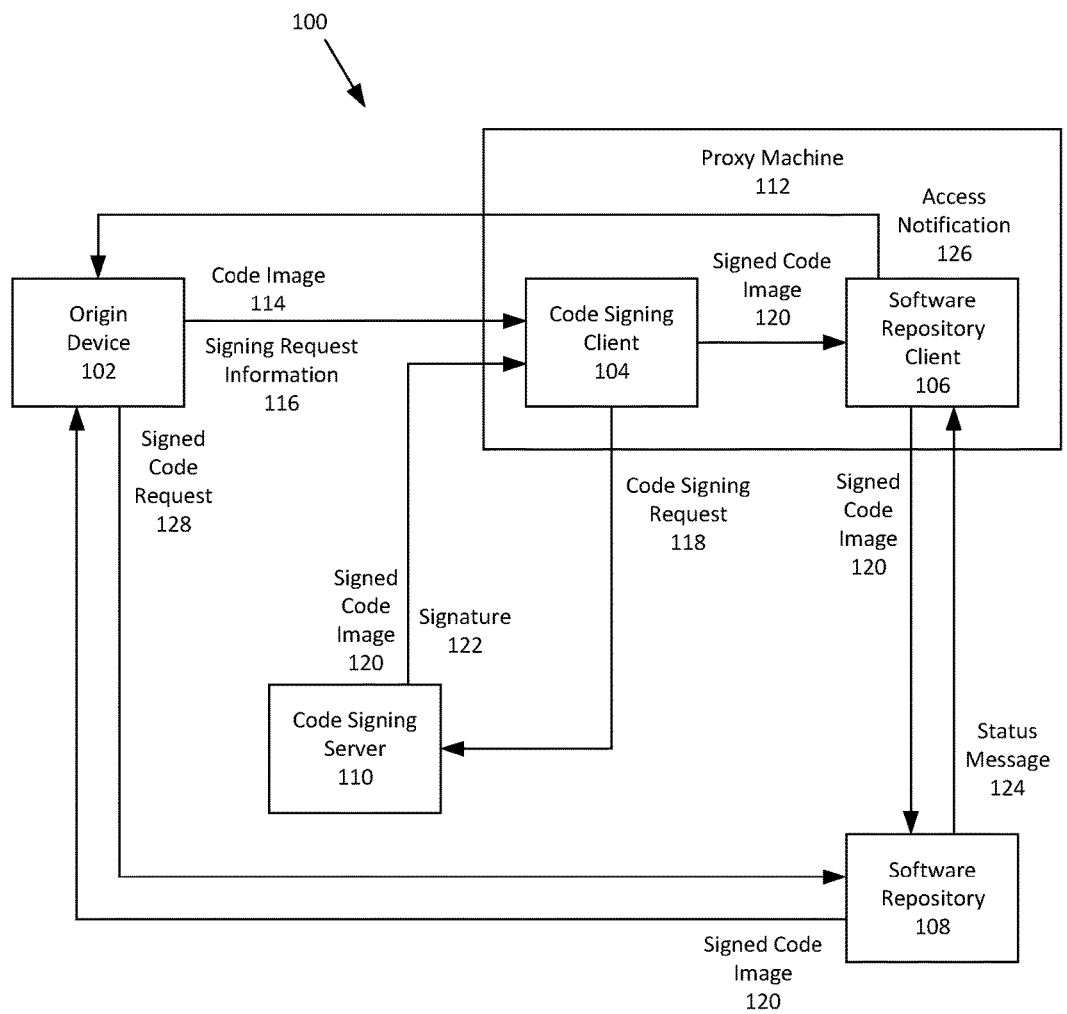
FIG. 1 depicts an embodiment of a code signing system comprising an origin device, a code signing client, a software repository client, a software repository, and a code signing server.

FIG. 1 depicts a code signing system 100. A code signing system 100 can comprise an origin device 102, a code signing client 104, a software repository client 106, a software repository 108, and a code signing server 110.

In some embodiments the code signing client 104 and software repository client 106 can be software applications that can run on the same hardware component, such as a proxy machine 112. A proxy machine 112 can be a computing device, such as a computer or server, comprising processors, memory, circuits, and/or other hardware and software elements. In alternate embodiments the code signing client 104 and software repository client 106 can run on different hardware components, such as different proxy machines 112 that are in data communication with one another over a network or direct data connection.

The origin device 102 can be a computing device, such as a computer or server, comprising processors, memory, circuits, and/or other hardware and software elements. The origin device 102 can be in at least temporary data communication with the code signing client 104, the software repository client 106, and/or the software repository 108 through a network and/or a direct data connection.

The origin device 102 can store a code image 114. The code image 114 can be a software or firmware image configured to be loaded onto end devices, such as a mobile phone, a cable box or other set-top box, a cable modem, or any other type of end device. The code image 114 can initially be unsigned and/or unencrypted when it is stored on the origin device 102. By way of a non-limiting example, a software developer or engineer can have compiled and/or prepared the code image 114 using the origin device 102 or another computing device, and stored the code image 114 at the origin device 102.

Security protocols on the end device can require that the code image 114 be cryptographically transformed before it can be loaded onto the end device. Cryptographic transformations can be transformations performed through one or more desired cryptographic operations, including signing the code image 114 with a signing key and/or encrypting the code image 114 with a digital encryption key. By way of a non-limiting example, a cable box can be configured to reject new firmware unless the new firmware has been signed in a manner that is recognized by the cable box.

To request that the unsigned code image 114 be signed, encrypted, and/or have any other transformation applied, the origin device 102 can submit the code image 114 to the code signing client 104 at a proxy machine 112. The origin device 102 can also submit signing request information 116 to the code signing client 104, including user credentials, the filename of the submitted code image 114, one or more cryptographic keys to be used by the code signing server 110, and/or a types of cryptographic operations being requested by the origin device 102, such as signing and/or encryption. As will be discussed further below, the code signing client 104 and code signing server 110 can generate a signed code image 120 from the original unsigned code image 114 using one or more cryptographic operations, and the software repository client 106 can store it at the software repository 108. The origin device 102 and/or other users and devices can receive an access notification 126 from the software repository client 106 when the signed code image 120 has been stored at the software repository 108. If desired, the origin device 102 can then submit a signed code request 128 to the software repository 108 to attempt to directly access the final signed code image 120.

The code signing client 104 can be a software application configured to run on a computing device, such as a proxy machine 112. In some embodiments the code signing client 104 can have a graphical user interface (GUI), a machine-to-machine interface, a command line interface, or any other type of interface. The code signing client 104 can be in at least temporary data communication with the origin device 102, the code signing server 110, and/or the software repository client 106 through a network and/or a direct data connection. The code signing client 104 can be configured to access unsigned code images 114 uploaded to the proxy machine from the origin device 102, as well as receive the signing request information 116 from the origin device 102.

The code signing client 104 can also be configured to transmit a code signing request 118 to the code signing server 110, and in response receive either a signed code image 120 or a digital signature 122 from which the code signing client 104 can generate a signed code image 120, and then provide the signed code image 120 to the software repository client 106.

The software repository client 106 can be a software application configured to run on a computing device, such as a proxy machine 112. The software repository client 106 can be in at least temporary data communication with the code signing client 104, the software repository 108, and the origin device 102 through a network and/or a direct data connection. The software repository client 106 can be configured to receive a signed code image 120 from the code signing client 104, and to transmit the signed code image 120 to the software repository 108. The software repository client 106 can further be configured to receive a status message 124 from the software repository 108, and to provide an access notification 126 to the origin device 102 and/or one or more pre-configured user accounts, such as by sending an access notification 126 to a user's email address once the status message 124 indicates the signed code image 120 has been stored at the software repository 108.

The software repository 108 can be a database and/or digital memory storage location configured to store signed code images 120. In some embodiments the software repository 108 can be located at a software distribution system or other computer or server that is in at least temporary data communication with the software repository 108 and the origin device 102 through a network and/or a direct data connection. In other embodiments the software repository 108 can be located at a memory location on the same proxy machine 120 as the software repository client 106. The software repository 108 can be configured such that access to the stored signed code images 120 is restricted only to authorized users. By way of a non-limiting example, the software repository 108 can be at a software distribution system that restricts access to signed code images 120 unless users demonstrate that they have been authorized to access the signed code images 120, appropriate export licenses have been obtained for the signed code images 120 or products that will incorporate the signed code images 120, or any compliance with any other desired condition has been established.

The code signing server 110 can be a computing device, such as a computer or server, comprising processors, memory, circuits, and/or other hardware and software elements. The code signing server 110 can be in at least temporary communication with the code signing client 104 through a network and/or a direct data connection. The code signing server 110 can be configured to store and/or manage digital cryptographic keys, such as digital signing and encryption keys. By way of a non-limiting example, in some embodiments the code signing server 110 can comprise a Hardware Security Module (HSM) that is configured to manage digital cryptographic keys for signing code images 114. The code signing server 110 can be further configured to use its digital cryptographic keys to sign, encrypt, and/or perform any other desired cryptographic operation on received code images 114 to produce signed code images 120. In some embodiments the code signing server 110 can transmit signed code images 120 it produces to the code signing client 104. In other embodiments the code signing server 110 can transmit a digital signature 122 that it generated and/or stored to the code signing client 104, such that the code signing client 104 can use it to produce a signed code image 120.

Figure 2:
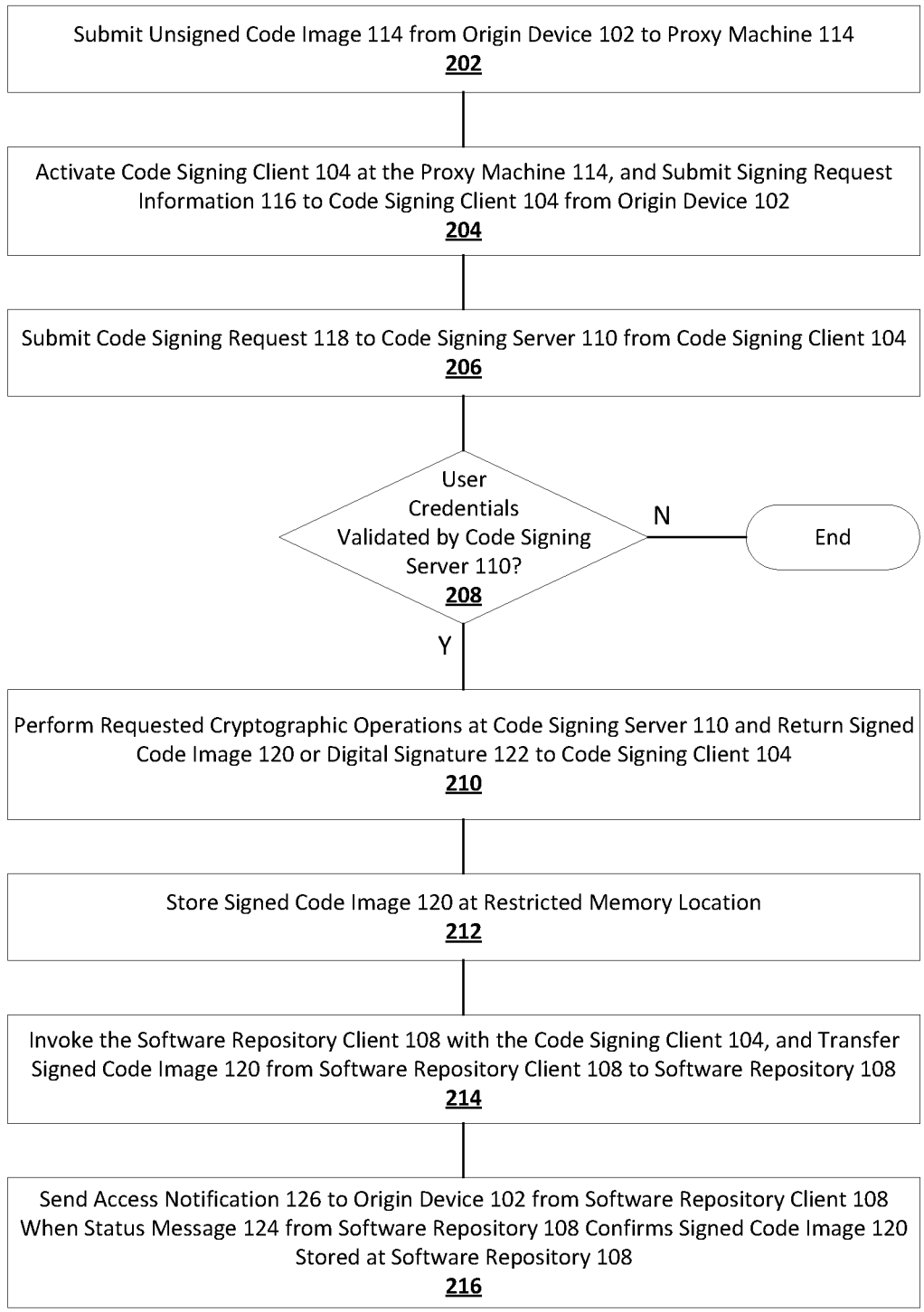
FIG. 2 depicts a method of signing code images using the system of FIG. 1, such that resulting signed code images are stored at the software repository.

FIG. 2 depicts a method of signing code images 120 using the system of FIG. 1, such that resulting signed code images 120 are stored at the software repository 108.

At step 202, an origin device 102 can transmit an initially unsigned code image 114 to the proxy machine 112 configured to run the code signing client 104. In some embodiments the origin device 102 can transmit the code image 114 to the proxy machine 112 using a secure protocol, such as SFTP (Secure File Transfer Protocol).

At step 204, the origin device 102 can activate the code signing client 104 at the proxy machine 112. By way of a non-limiting example, a user of the origin device 102 can remotely log in to the proxy machine 112 with an authorized user account, and execute a command or script that causes the code signing client 104 to run on the proxy machine 112. The origin device 102, and/or a user of the origin device 102, can additionally transmit signing request information 116 to the code signing client 104 through additional commands, as part of a script, and/or through file transfers.

In some embodiments or situations, signing request information 116 can comprise user credentials, such as a username and password associated with a user, a digital signature created from a private key and a digital certificate embedded in a device issued to a user, such as a USB token or smartcard, or any other type of user credentials.

In some embodiments or situations, signing request information 116 can comprise the filename of the code image 114 previously uploaded to the proxy machine 112 during step 202. In alternate embodiments, step 202 can be skipped and the origin device 102 can transmit the code image 114 to the code signing client 104 after the code signing client 104 has started running and/or the code signing client 104 the has accepted provided user credentials.

In some embodiments or situations, signing request information 116 can comprise instructions indicating types of cryptographic operations requested for the code image 114 by the origin device 102, such as digital signing and/or encryption, and/or one or more cryptographic keys to be used by the code signing server 110. In some embodiments the instructions can directly indicate requested types of cryptographic operations, a reference to the provided cryptographic keys, and/or any other instructions, parameters, or information related to the requested cryptographic operations. In other embodiments or situations, the instructions can refer to a predefined code signing configuration.

In some embodiments or situations, the code signing client 104 can process the code image 114 locally before moving to step 206. In various embodiments, processing performed locally at the code signing client 104 can include hashing the code image 114, and/or adding a header and/or footer to the code image 114. By way of a non-limiting example, headers and/or footers can be added to indicate a predefined code version or model number of the end device for which the code image 114 is intended. In other embodiments or situations step 206 can the code signing client 104 can move directly to step 206 after being activated and receiving signing request information 116 from the origin device 102.

At step 206, the code signing client 104 can transmit a code signing request 118 to the code signing server 110. In some embodiments or situations, the code signing request 118 can comprise the code image 114, some or all of the signing request information 116, including provided user credentials and cryptographic keys, and/or a request from the code signing client 104 that the code signing server 110 sign the code image 114 according to the types of cryptographic operations requested by the origin device 102. In other embodiments or situations, the code signing request 118 can comprise a hash value associated with the code image that was determined by the code signing client 104 prior to step 206, as well as some or all of the signing request information 116 and/or a request from the code signing client 104 that the code signing server 110 sign the code image 114 according to the types of cryptographic operations requested by the origin device 102.

At step 208, the code signing server 110 can attempt to validate user credentials provided in the code signing request 118, to determine whether the user is a known user and whether the user has been authorized to request the specified types of cryptographic operations. If the code signing server 110 does not recognize the provided user credentials, determines that the user credentials are expired or otherwise invalid, and/or determines that the user associated with the user credentials has not been authorized to request the types of cryptographic operations indicated in the signing request information 116, the code signing request 118 can be rejected and the process can end. However, if the code signing server 110 validates the user credentials, the code signing server 110 can move to step 210.

At step 210 the code signing server 110 can perform the types of cryptographic operations requested in the code signing request 118, such as signing and/or encrypting the code image 114. By way of a non-limiting example, to digitally sign the code image 114, the code signing server 110 can hash the unsigned code image 114 and generate a digital signature 122 from the hash value using a digital signing key that has a corresponding verification key known to end devices. In embodiments or situations in which the code signing client 104 hashed the unsigned code image 114 and provided the hash value as part of the code signing request 118, the code signing server 110 can use the received hash value to generate the digital signature 122 using a signing key that has a corresponding verification key known to end devices. The generated digital signature 112 can be combined with the unsigned code image 114 to generate a signed code image 120, either by the code signing server 110 or by the code signing client 104.

Similarly, to digitally encrypt the code image 114, the code signing server 110 can encrypt the code image 114 and generate a signed code image 120 using an encryption key known to end devices such that the end devices can decrypt the signed code image 120. The signing keys, encryption keys, and/or any other encryption keys can be cryptographic keys stored and managed at the code signing server 110 or cryptographic keys provided by the origin device 102 as part of the signing request information 116 and passed to the code signing server 110 from the code signing client 104 as part of the code signing request 118.

In some embodiments or situations the code signing server 110 can add a header and/or footer to the code image 114 prior to signing, encrypting, or performing any other cryptographic operation on the code image 114. By way of a non-limiting example, headers and/or footers can be added to indicate a predefined code version or model number of the end device for which the code image 114 is intended. In other embodiments or situations the code signing server 110 can directly sign the code image 114 without adding a header and/or footer.

In some embodiments or situations the code signing server 110 can transmit the signed code image 120 it generated during step 210 to the code signing client 104. In other embodiments or situations, the code signing server 110 can transmit a digital signature 122 it generated from a hash value during step 210 to the code signing client 104, without sending a full signed code image 120. By way of a non-limiting example, when the code signing server 104 sent a hash value instead of the full code image 114 as part of the code signing request 118, the code signing server 110 can return the digital signature 122 it generated from that hash value. By way of another non-limiting example, in some situations when the code signing server 110 did receive the full code image 114 as part of the code signing request 118, the code signing server 110 can save bandwidth and/or transmission time by returning only the generated digital signature 112. In embodiments in which the code signing server 110 sends a digital signature 122 to the code signing client 104 instead of a signed code image 120, the code signing client 104 can be configured to generate the signed code image 120 itself locally using the received digital signature 122 and combining it with its copy of the unsigned code image 114.

At step 212, the code signing client 104 can store the received or generated signed code image 120 locally in a restricted memory location that the requesting user and/or origin device 102 and/or user is not authorized to access. By way of a non-limiting example, security permissions can be set at the proxy machine 112 such that the origin device 102 and/or user is limited to executing certain pre-defined scripts or commands to operate the code signing client 104, but are not authorized to execute commands or scripts that would access the signed code image 120, and/or the origin device 102 and/or user can be restricted to uploading files to certain folders or directories at the proxy machine 112 but be restricted from accessing the folder or directory where the signed code image 120 is stored.

At step 214, the code signing client 104 can invoke the software repository client 106, such that the software repository client 106 transfers the signed code image 120 to the software repository 108. In some embodiments the software repository client 106 can be run on the same proxy machine 112 as the code signing client 104, such that the software repository client 106 can access the signed code image 120 at the restricted local memory location where it was stored during step 212. In alternate embodiments, the software repository client 106 can be run on a different proxy machine 112, and the signed code image 120 can be transferred to the software repository client 106 from the code signing client 104 using a secure protocol such as SFTP.

The software repository client 106 can transfer the signed code image 120 to the software repository 108 using a secure protocol, such as SFTP. The software repository 108 can return a status message 124 indicating whether the signed code image 120 was successfully received and stored in the software repository 108.

At step 216, when the software repository client 106 receives a status message 124 indicating that the signed code image 120 has been successfully stored in the software repository 108, the software repository client 106 can send an access notification 126 to the origin device 102 indicating that the signed code image 120 is now stored at the software repository 108. In some embodiments, the software repository client 106 can additionally or alternately send access notifications 126 to one or more pre-determined user accounts. By way of a non-limiting example, the software repository client 106 can send access notifications 126 via email to one or more designated user email addresses.

Once the signed code image 120 is stored in the software repository, authorized users and/or devices can access the software repository 108 to request a copy of the signed image. In some embodiments or situations, the same user and/or origin device 102 that submitted the original unsigned code image 114 and signing request information 116 can submit a signed code request 128 to the software repository 108 to request a copy of the signed code image 120. In other situations or embodiments, any other user and/or device can submit a request for a copy of the signed code image 120.

In some embodiments, the software repository 108 can be managed at a software distribution system, or otherwise have restrictions on how signed code images 120 can be accessed. In some embodiments the signed code requests 128 can be rejected from users and/or devices unless one or more access conditions have been met. By way of non-limiting examples, the software repository 108 can restrict access to a signed code image unless the signed code request 128 includes user credentials indicating that the user operating the origin device 102 is authorized to access the signed code image 120, that export licenses have been obtained for the signed code image 120 and/or end devices for which the signed code image 120 is intended, and/or any other access conditions have been satisfied.

If a user and/or device that requests a copy of the signed code image 120 is found to be authorized to access the signed code image 120, the software repository 108 can transmit a copy of the requested signed code image 120 to the requesting user and/or device. The signed code image 120 can then be loaded onto end devices.

Although the present invention has been described above with particularity, this was merely to teach one of ordinary skill in the art how to make and use the invention. Many additional modifications will fall within the scope of the invention, as that scope is defined by the following claims.

The invention claimed is:

1. A method of redirecting signed code images, comprising:
receiving a code image from an origin device;

invoking a code signing client in response to instructions received from said origin device;

receiving signing request information at said code signing client from said origin device, said signing request information indicating a requested cryptographic operation;

sending a code signing request from said code signing client to a code signing server, wherein said code signing request comprises said code image and said requested cryptographic operations;

receiving a signed code image at said code signing client from said code signing server in response to said code signing request;

storing said signed code image in a restricted memory location at a proxy machine;

invoking a software repository client at said proxy machine with said code signing client;

sending said signed code image from said restricted memory location to a software repository with said software repository client; and providing information to the software repository client to enable the origin device to submit a signed code request to enable access to the signed code image;

receiving a status message from said software repository at said software repository client, said status message indicating that said signed code image has been stored at said software repository client; and sending an access notification to one or more users from said software repository client upon receipt of said status message, said access notification indicating that said signed code image is available to authorized users at said software repository.

2. The method of claim 1, wherein said signing request information further comprises user credentials provided to code signing client by said origin device as part of said signing request information, and said code signing request comprises said user credentials.

3. The method of claim 1, wherein said requested cryptographic operation is digital signing of said code image with a digital signing key stored at said code signing server.

4. The method of claim 1, wherein said requested cryptographic operation is encryption of said code image with a digital encryption key stored at said code signing server.

5. The method of claim 1, wherein said code signing client comprises a graphical user interface remotely operable through said origin device.

6. The method of claim 1, further comprising adding a header and/or footer to said code image at said code signing client prior to sending said code signing request to said code signing server.

7. A code signing system, comprising:
a an origin device;
a code signing server;
a code signing client in selective data communication with the origin device, and the code signing server, wherein said code signing client is configured to receive an unsigned code image from said origin device, submit said unsigned code image to said code signing server with a code signing request, receive a signed code image from said code signing server in response to said code signing request, and store said signed code image at a restricted memory location at a proxy machine; and
a software repository client, wherein said code signing client is configured to access said signed code image at said restricted memory location, transmit said signed code image to said software repository, receive a status message from said software repository confirming that said signed code image has been stored at said software repository, and send an access notification to one or more users when said status message is received, allowing the users, including the origin device, to submit a signed code request to enable access to the signed code image.

8. The code signing system of claim 7, wherein said code signing client is configured to invoke said software repository client at said proxy machine upon receipt of said signed code image from said code signing server.

9. The code signing system of claim 7, wherein said code signing client is further configured to receive signing request information from said origin device, said signing request information indicating a requested cryptographic operation and user credentials.

10. The code signing system of claim 9, wherein said code signing client is configured to send said requested cryptographic operation and said user credentials to said code signing server as part of said code signing request.

11. The code signing system of claim 9, wherein said requested cryptographic operation is digital signing of said unsigned code image with a digital signing key stored at said code signing server.

12. The code signing system of claim 9, wherein said requested cryptographic operation is encryption of said unsigned code image with a digital encryption key stored at said code signing server.

13. The code signing system of claim 7, wherein said code signing client comprises a graphical user interface operable remotely by a user of said origin device.

14. The code signing system of claim 7, wherein said code signing client is further configured to add a header and/or footer to said unsigned code image prior to sending said code signing request to said code signing server.

* * * * *